(12) United States Patent  
Pockett et al.

(10) Patent No.: US 8,300,086 B2
(45) Date of Patent: Oct. 30, 2012

(54) IMAGE PROCESSING FOR SUPPORTING A STEREOSCOPIC PRESENTATION

(75) Inventors: Lachlan Pockett, Tampere (FI); Marius Tico, Tampere (FI); Timo Pylvänäinen, Tampere (FI); Sakari Alenius, Lempäälä (FI)

(73) Assignee: Nokia Corporation, Espoo (FI)

( * ) Notice: Subject to any disclaimer, the term of this patent is extended or adjusted under 35 U.S.C. 154(b) by 1105 days.

(21) Appl. No.: 12/005,038

(22) Filed: Dec. 20, 2007

(65) Prior Publication Data

US 2009/0160931 A1 Jun. 25, 2009

(51) Int. Cl.
*H04N 13/00* (2006.01)

(52) U.S. Cl. .............. 348/42; 348/47; 348/50; 348/51

(58) Field of Classification Search .......... 348/42, 348/47, 50, 51
See application file for complete search history.

(56) References Cited

U.S. PATENT DOCUMENTS

| | | | |
|---|---|---|---|
| 6,449,004 B1 * | 9/2002 | Okisu et al. | 348/44 |
| 7,466,336 B2 * | 12/2008 | Regan et al. | 348/50 |
| 2004/0145655 A1 | 7/2004 | Tomita | |
| 2005/0285945 A1 | 12/2005 | Usui et al. | |
| 2007/0024701 A1 * | 2/2007 | Prechtl et al. | 348/47 |
| 2007/0248260 A1 | 10/2007 | Pockett | |
| 2008/0180522 A1 * | 7/2008 | Kim et al. | 348/50 |

FOREIGN PATENT DOCUMENTS

| | | |
|---|---|---|
| CN | 1713742 | 12/2005 |
| EP | 1383342 | 1/2004 |
| JP | 2006-121229 | 5/2006 |
| WO | WO 02/44808 | 6/2002 |
| WO | WO 2007/057497 | 5/2007 |

OTHER PUBLICATIONS

Jie He, et al; "Modified Fast Climbing Search Auto-focus Algorithm with Adaptive Step Size Searching Technique for Digital Camera;" IEEE Transactions on Consumer Electronics, vol. 49, No. 2, May 2003; pp. 257-262.
Office Action for Korean Patent Office, Application No. 2010-7016172, dated Aug. 24, 2012.
Office Action for Chinese Patent Office, Application No. 200880118598.7, dated Sep. 4, 2012.

\* cited by examiner

*Primary Examiner* — Liangche A Wang (74) *Attorney, Agent, or Firm* — Alston & Bird LLP (57) ABSTRACT

An image processing is applied in common to image data for a first image and to image data for a second image. The image data for the first image and the image data for the second image are moreover compared as a basis for matching a visual appearance of images for a stereoscopic presentation. The visual appearance can be matched in the current pair of images by adjusting at least one of the images accordingly and/or in future pairs of images by adjusting parameters of at least one of the image capturing components providing the image data.

24 Claims, 7 Drawing Sheets

IMAGE PROCESSING FOR SUPPORTING A STEREOSCOPIC PRESENTATION

FIELD OF THE INVENTION

The invention relates to stereoscopic presentations and more specifically to a processing of image data in support of a stereoscopic presentation.

BACKGROUND OF THE INVENTION

Stereoscopic displays allow presenting an image that is perceived by a user as a three-dimensional (3D) image. To this end, a stereoscopic display directs information from certain sub-pixels of an image in different directions, so that a viewer can see a different picture with each eye. If the pictures are similar enough, the human brain will assume that the viewer is looking at a single object and fuse matching points on the two pictures together to create a perceived single object. The human brain will match similar nearby points from the left and right eye input. Small horizontal differences in the location of points will be represented as disparity, allowing the eye to converge to the point, and building a perception of the depth of every object in the scene relative to the disparity perceived between the eyes. This enables the brain to fuse the pictures into a single perceived 3D object.

The data for a 3D image may be obtained for instance by taking multiple two-dimensional images and by combining the pixels of the images to sub-pixels of a single image for the presentation on a stereoscopic display.

In one alternative, two cameras that are arranged at a small pre-specified distance relative to each other take the two-dimensional images for a 3D presentation.

Each camera usually comprises an image chain applying an image processing to the captured images, as known from conventional two-dimensional (2D) image processing.

A Euclidian image shift with image edge cropping is applied to the processed images to move the zero displacement plane or zero disparity plane (ZDP) to lie in the middle of the virtual scene, in order to converge the images. The images are then combined by interlacing to form a 3D presentation.

In the context of the ZDP, disparity is a horizontal linear measure of the difference between where a point is represented on a left hand image and where it is represented on a right hand image. There are different measures for this disparity, for example arc-min of the eye, diopter limits, maximum disparity on the display, distance out of the display at which an object is placed, etc. These measures are all geometrically related to each other, though, so determining the disparity with one measure defines it as well for any other measure for a certain viewing geometry. When taking two pictures with parallel cameras, the cameras pick up a zero angular disparity between them for an object at infinite distance, and a maximum angular disparity for a close object, that is, a maximum number of pixels disparity, which depends on the closeness of the object and the camera separation, as well as on other factors, like camera resolution, field of view (FOV), zoom and lens properties. Therefore the horizontal disparity between two input images taken by two parallel cameras ranges from zero to maximum disparity. On the display side, there is a certain viewing geometry defining for instance an allowed diopter mismatch, relating to a maximum convergence angle and thus to a maximum disparity on the screen.

The image cropping removes the non-overlapping parts of the images, and due to the Euclidian image shift, the remaining pixels of both images in the ZDP have the same indices. In the ZDP, all points in a XY plane lie on the same position on both left and right images, causing the effect of objects to be perceived in the plane of the screen. The ZDP is normally adjusted to be near the middle of the virtual scene and represents the depth of objects that appear on the depth of the screen. Objects with positive disparity appear in front of the screen and objects with negative disparity appear behind the screen. The horizontal Euclidian shift moves the ZDP and respectively changes all the object disparities relative to it, hence moving the scene in its entirety forwards or backwards in the comfortable virtual viewing space (CVVS).

On the display side, the disparity may range from a negative maximum value for an object that appears at a back limit plane (BLP) and a maximum positive value for an object that appears at a frontal limit plane (FLP). FLP and BLP thus provide limits in the virtual space as to how far a virtual object may appear in front of the screen or behind the screen.

Since in stereoscopic imaging the left and right images are simultaneously viewed and compared to each other, the slightest of differences between the images are readily detected. This makes stereoscopic imaging much more susceptible to minute discrepancies between the images which would not even be noticed in standard 2D presentations. With the human brain making the assumption that both images are derived from one 3D object, it compares the images, looking for slight differences. For example, an artifact causing an object offset of one pixel would not be noticeable in a 2D imaging, but in stereoscopy it could represent the difference between an object being at infinite distance and being at 100 m. Also differences in gamma, contrast, color balance and/or sharpness etc. become readily detectable, and can cause severe negative nauseating sensations. For example, while incorrect exposure of up to one f-stop is not critical in a 2D photography, such a difference in a stereo image pair can cause varying degrees of eye strain and/or nausea in poorly created content, producing a degradation of the stereoscopic viewing experience.

The images directed to the left and right eye should thus ideally not have any differences except the parallax arising due to a different perspective point.

For creating high quality 3D images, the alignment of the employed cameras is critical. Further, both cameras should have the same aperture, that is, the same diameter of the iris. It is also very desirable that both cameras use the same focus depth. However, focus can be very sensitive to control and due to manufacturing discrepancies it may not be directly possible to clone the focus of one camera to the other. Similarly, the sensitivities of employed charge-coupled device (CCD) matrices may vary and thus cloning the gain values applied by these matrices may not result in similar images. In addition, there may also be other types of mismatching between the images due to different camera properties, for example a mismatch of white balance, sharpness, granularity and various other image factors.

SUMMARY

A method is described, which comprises applying an image processing in common to image data for a first image and to image data for a second image. The method further comprises comparing the image data for the first image and the image data for the second image as a basis for matching a visual appearance of images for a stereoscopic presentation.

Moreover, an apparatus is described, which comprises a image processing component configured to apply an image processing in common to image data for a first image and to image data for a second image. The apparatus further comprises an image comparison component configured to compare the image data for the first image and the image data for the second image as a basis for matching a visual appearance of images for a stereoscopic presentation.

The components of the described apparatus can be implemented in hardware and/or software. They may be implemented for instance in the form of a processor executing software program code for realizing the required functions. Alternatively, they could be implemented in the form of one or more circuits that are designed to realize the required functions, for instance in a chipset or a chip, like an integrated circuit.

The described apparatus may be limited to the indicated components, but it may equally comprise various other components, for instance two image capturing components and/or a stereoscopic display and/or a wireless communication component enabling at least one of a reception of captured image data and a transmission of processed image data. The two image capturing components could be for instance a pair of cameras arranged with a fixed spacing or a single camera sharing the same lens for two image sensors.

The described apparatus can further be for example an electronic device, like a digital camera, a laptop or a mobile phone, or a module for an electronic device.

Moreover, a system is described, which comprises the described apparatus and in addition at least two image capturing components configured to capture image data and to provide the captured image data to the apparatus. The data link between the apparatus and the image capturing components could be of any kind, including wired and wireless links.

Finally, a computer program product is proposed, in which a program code is stored in a computer readable medium. The program code realizes the described method when executed by a processor.

The computer program product could be for example a separate memory device, or a memory that is to be integrated in an electronic device.

The invention is to be understood to cover such a computer program code also independently from a computer program product and a computer readable medium.

It is to be understood that the invention is not limited to the processing of image data for two images, it could also used for a common processing and comparison of image data for more images. Further, the first image and the second image could be still images or belong to a respective video.

The image processing and the image comparison can be carried out in any order. If the image comparison precedes the image processing, the image comparison has to be based on the original image data. Otherwise, it can be based either on the original image data or on the commonly processed image data. Matching a visual appearance of images is not to be understood to remove disparities arising from parallax between the images that are required for a stereoscopic presentation.

The described common processing of the image data of several images allows a reduction of workload compared to a separate processing, since it reduces the amount of image processing that needs to be carried out. As a result, also the required processing time is shortened. Applying an image processing in common to several images ensures moreover that the processing does not introduce additional discrepancies to the images. The processed images are thus better balanced than with separate processing chains. When used in a stereoscopic presentation, the images result consequently in fewer differences between what is directed to the left eye and the right eye.

The described comparison of the image data allows reducing the original discrepancies between the images. If the matching is to be based on processed images, the matching is facilitated and optimized by a preceding common processing of the data of the images. For instance, run-time differences, which may result if the images go through a different independent algorithm processes, can be avoided by the combined processing.

In an exemplary embodiment, the image data for the first image and the image data for the second image is cropped for obtaining data of overlapping parts of the first image and the second image. The common processing may then only be applied to image data of the overlapping parts. This further reduces the processing load. Either, only the cropped images are provided for further processing and the rest of the image data is discarded, or all image data is provided for the further processing together with an indication of the amount of cropping.

The common processing may comprise for instance linearization, dark current compensation, flare compensation, noise reduction, white balance adjustment, demosaicking, color transformation, non-linearization, sharpening, and various other adjustments known from conventional image processing chains.

In another exemplary embodiment, applying a common image processing to image data comprises determining global settings for parameters employed by at least two image capturing components providing the image data for the first image and for the second image, respectively. The global settings may comprise for example values for a shutter time, an iris aperture, an integration time for an image sensor and/or a gain.

At least one parameter employed by each of the at least two image capturing components may be set in common according to a determined global setting. The at least one parameter may be for example a shutter time and/or an integration time. The other determined global settings, if any, may be used as a basis for additional individual settings.

In one exemplary embodiment, also comparing the image data may comprise comparing only image data of relevant parts of the first image and of the second image. The relevant parts may include in particular only those parts of images that are used in a stereoscopic presentation. The relevant parts may be determined based on information about a Euclidean shift applied to at least one of the image data for the first image and the image data for the second image. Alternatively or in addition, they may be determined based on information about a cropping applied to at least one of the image data for the first image and the image data for the second image. Both alternatives allow reducing the required processing amount.

Alternatively or in addition, they may be determined based on information about occlusion spaces experienced by at least one of the images compared to the respective other image. The latter alternatives allows as well reducing the required processing amount. In addition, it allows neglecting parts of the images that are not comparable, since they contain different objects in both images. Instead of determining the relevant parts at this stage, only the image data for the relevant parts may be provided for the comparison in the first place.

In one exemplary embodiment, a result of the comparing of the image data is used for adjusting the image data for the first image and/or the image data for the second image for matching a visual appearance of the first image and the second image for a stereoscopic presentation of these images. The comparison may be used for example for matching the gamma value, the contrast, the color balance and/or the sharpness of both images.

Alternatively or in addition, a result of the comparing of the image data may be used for determining for at least one image capturing component providing the image data for one of the first image and the second image an individual setting for an employed parameter. The parameter employed by the at least one image capturing component may then be set according to the determined individual setting. This ensures matching a visual appearance of future images captured with the same image capturing components for a stereoscopic presentation. The individual settings may comprise for example values for an offset for a focus and/or for a gain. In case a global setting has already been determined for the parameter in question, it would be possible for example to use this global setting as individual setting for one image capturing component. In addition, the global setting could be adjusted based on the comparison and be used as an individual setting for the other image capturing component.

In another exemplary embodiment, comparing the image data comprises determining an object in a focus of the first image and determining the same object in the second image. A sharpness adjustment may then be applied for the determined object in the second image. Alternatively or in addition, focus adjustment could be applied to an image capturing component providing the second image based on the determined object. As a result, an equivalent focus is provided for both image capturing components.

Determining the same object in the second image may comprises determining a distance of the object based on a focus of an image capturing component providing the first image. A distance of an object correlates to a particular disparity, so it is possible to determine a disparity that is associated to the distance, for example using a lookup table or predetermined calculation rules. The disparity allows determining the same object in the second image, and hence shifting the focus area of the second camera to focus on the same object.

It is to be understood that all presented exemplary embodiments as well as their separate features may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
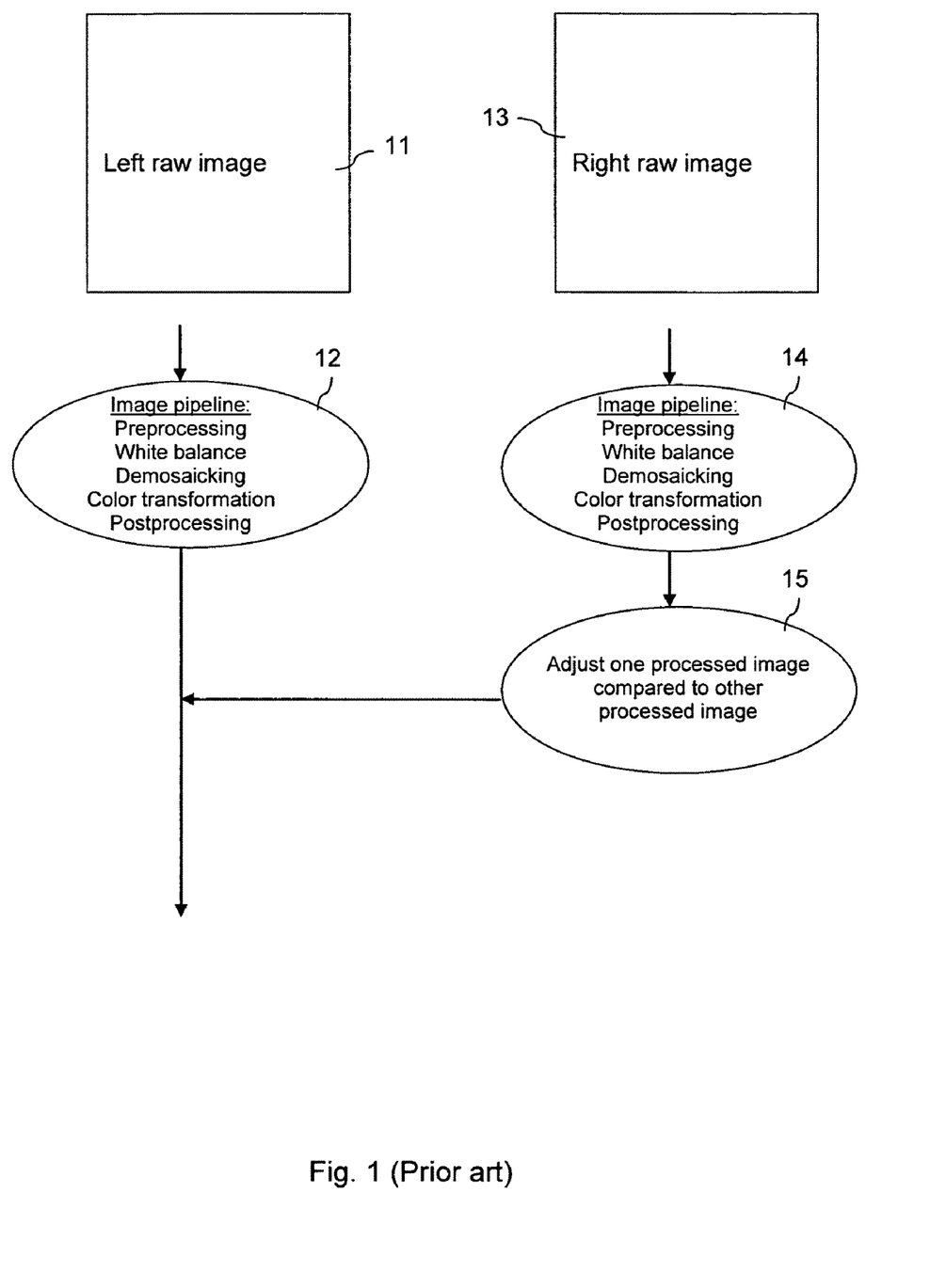
FIG. 1 is a flow chart schematically illustrating a conventional image processing for a stereoscopic presentation.
Figure 2:
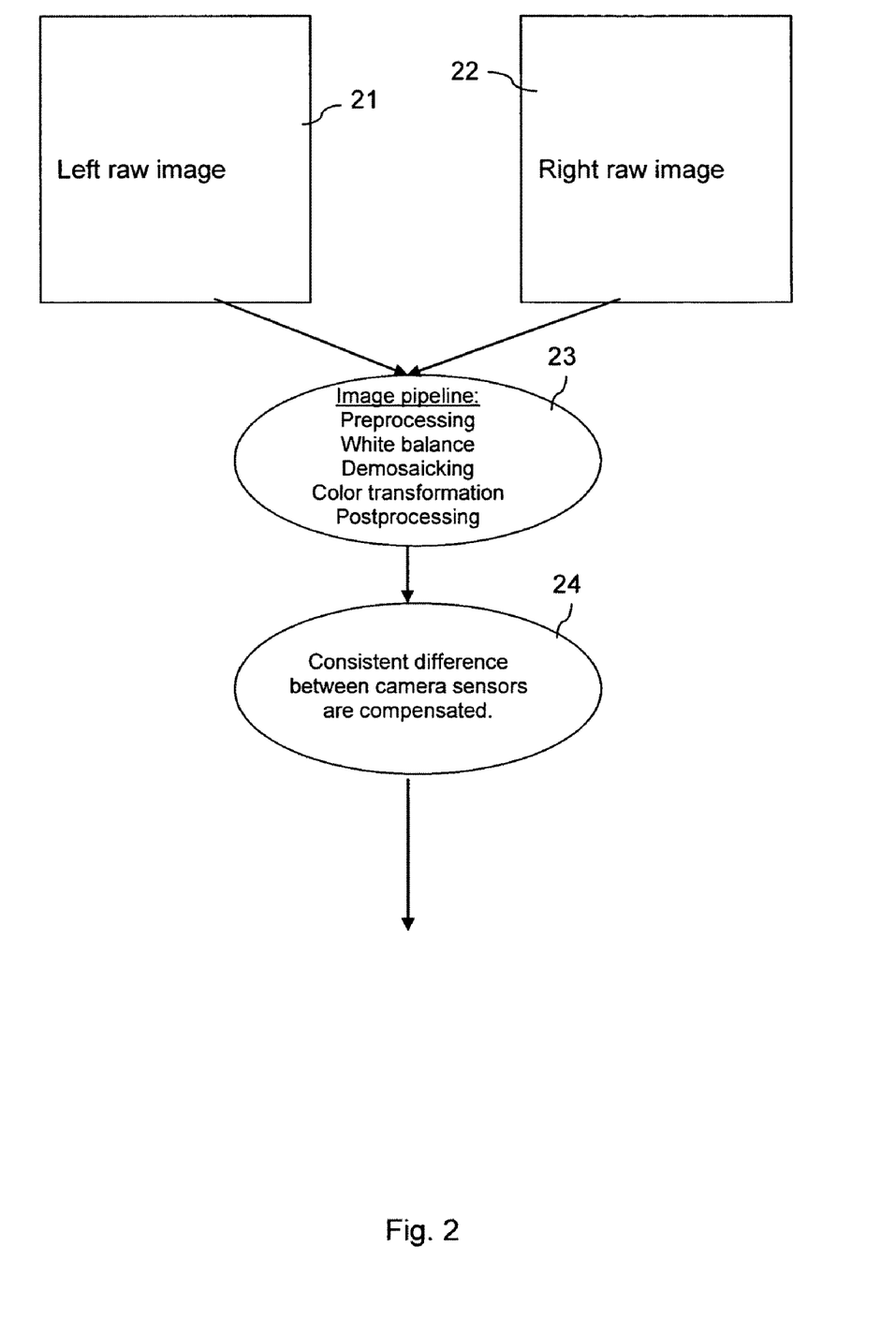
FIG. 2 is a flow chart schematically illustrating an image processing for a stereoscopic presentation according to an embodiment of the invention.

FIGS. 1 and 2 are flow charts schematically illustrating the difference between the conventional image processing for a stereoscopic presentation and the processing according to an exemplary embodiment of the invention.

The flow chart of FIG. 1 represents a conventional method, which uses two parallel image processing chains.

The image data of a left raw image 11 is processed in a first image chain. The first image chain subjects the data to an image processing pipeline, including preprocessing, white balance adjustment, demosaicking (also called "Color Filter Array Interpolation"), color transformation and postprocessing (step 12). The preprocessing may include for instance linearization, dark current compensation, flare compensation and noise reduction. The postprocessing may include for instance non-linearization (gamma correction), sharpening, etc. The image data of a right raw image 13 is processed separately in a second image chain in a corresponding image processing pipeline (step 14).

The processed data of the right image is then further adjusted under consideration of the processed data of the left image using perspective transformations (step 15). The adjustment has the aim that only desired discrepancies between the images remain, before the images are combined for use in a stereoscopic presentation. The adjustment may comprise applying color balance and gamma corrections by comparing the data of the processed left and right images and by adjusting the right image to match the left image. If such adjustments are applied at the end of separate image processing chains, the result may not optimal though.

The flow chart of FIG. 2 represents an exemplary method according to the invention, which uses instead a single image processing chain for processing the image data of a left raw image 21 and a right raw image 22.

The image processing chain may include again the same image processing pipeline as presented with reference to FIG. 1. But in this case, the data of both images is subjected in common to the same pipeline and thus the same control parameters of the included processing algorithms are used for the processing of all data (step 23). The control parameters may be determined based on the data for both images. Since the raw images are thus passed simultaneously through the same processing chain, they receive exactly the same global image transformations.

Only consistent undesired differences between the data for left and right image are compensated separately in at least one of the images for improving the image matching (step 24).

Figure 3:
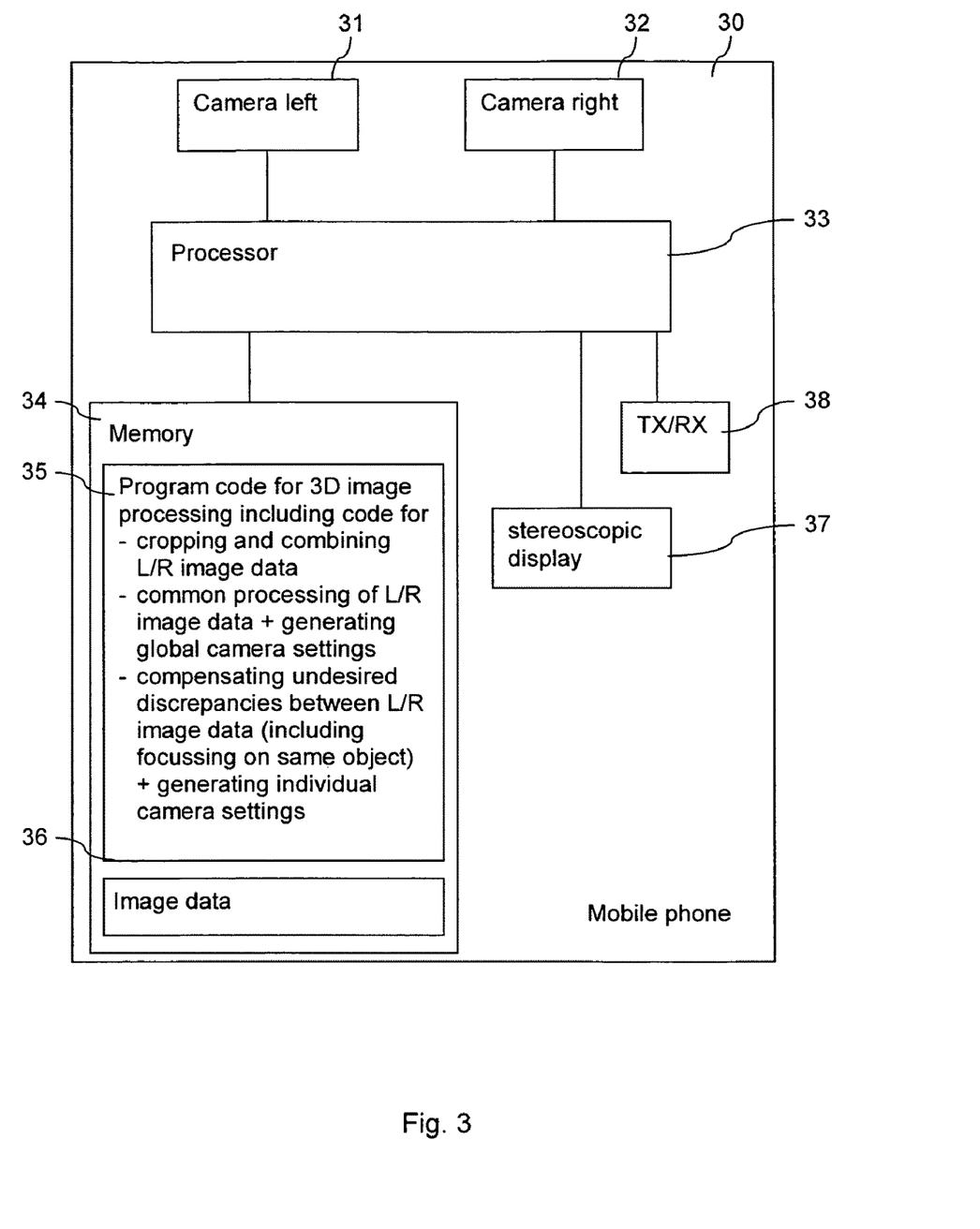
FIG. 3 is a schematic block diagram of a device according to an embodiment of the invention.

FIG. 3 presents an exemplary embodiment of a device 30 according to the invention. By way of example, the device 30 is assumed to be a mobile phone.

The device 30 comprises a left camera 31 and a right camera 32. Alternatively, the cameras 31, 32 could be external to the device 30. In any case, the cameras 31, 32 are arranged at a predetermined distance to each other and more specifically such that they are at the same height when capturing images for a stereoscopic presentation. The device 30 further comprises a processor 33, which is configured to execute various processing code. The device 30 moreover comprises a memory 34.

The memory 34 includes a section 35 for storing program code. The processor 33 may retrieve any desired processing code from the memory 34 for execution.

The stored program code includes code for stereoscopic image processing. This code includes for instance code for cropping and combining data of two images, in particular a left (L) image and a right (R) image, for common image processing of data of both images, for compensating undesired discrepancies between data of both images and for generating global and/or individual camera settings. The memory 34 further includes a section 36 for storing data, for instance processed or non-processed image data.

The device 30 may further comprise a stereoscopic display 37 and/or a transceiver 38 enabling a wireless communication with other devices or with some access point of a wireless communication network.

Either the device 30 or the combination of processor 33 and memory 34 could for instance be considered to be an embodiment of an apparatus according to the invention.

Figure 4:
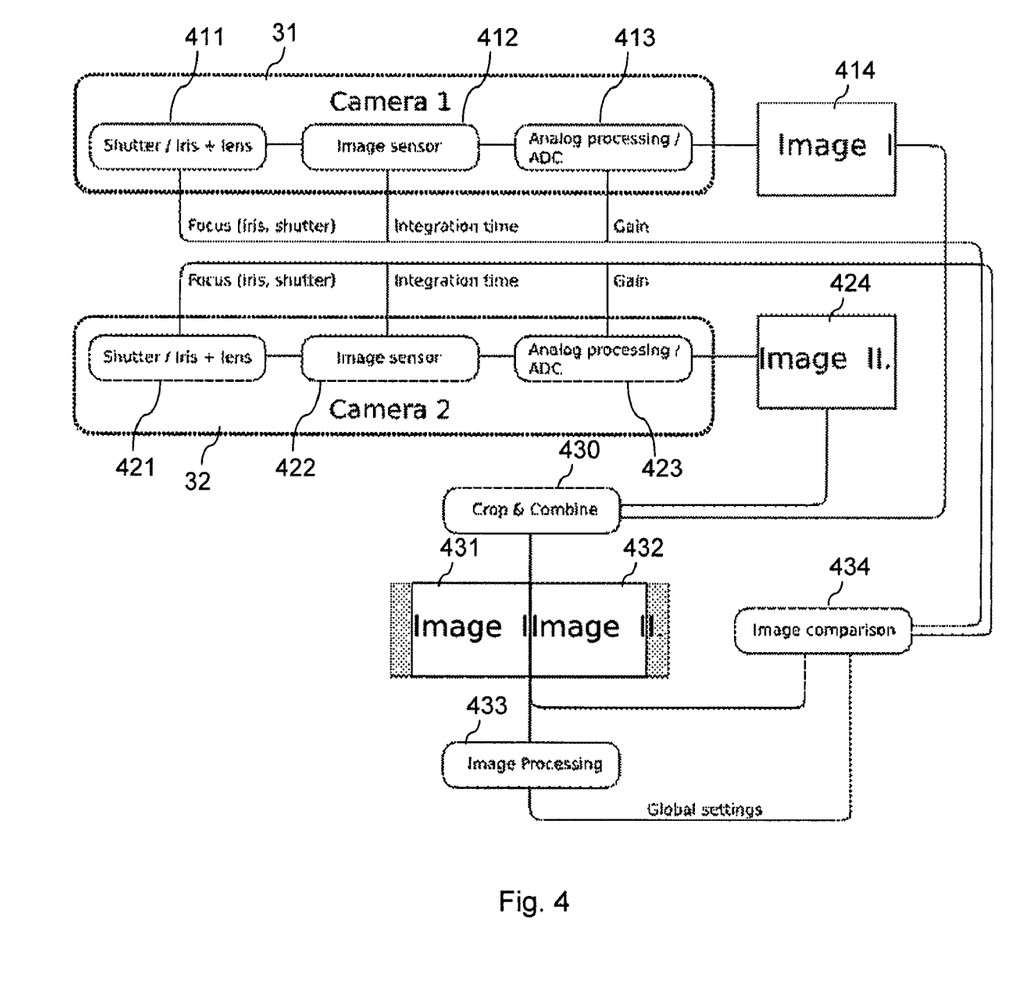
FIG. 4 is a schematic diagram illustrating an exemplary operation in the apparatus of FIG. 3.

FIG. 4 is a schematic diagram illustrating exemplary further details the device 30 of FIG. 3 and an exemplary processing in the device 30 of FIG. 3.

Within the left camera 31, denoted in FIG. 4 as camera 1, shutter, iris and lens 411 are operated in accordance with settings applied to a control input so that an image is captured by an image sensor 412 with a desired shutter speed, a desired iris aperture and a desired focus. The image sensor 412 uses an integration time which is set via a control input. The captured image data is processed by processing component 413 in the analog domain, in particular by applying a gain according to a gain value that is indicated via a control input. The processing component 413 further includes an analog-to-digital converter (ADC), which converts the processed analog image data into digital image data. The result is digital image data of a left raw image 414 that is to be used for a stereoscopic presentation. This left image 414 is denoted in FIG. 4 as Image I.

Within the right camera 32, denoted in FIG. 4 as camera 2, shutter, iris and lens 421, image sensor 422 and processing component 423 are controlled and operate in the same manner as the corresponding components of the first camera 31 using own settings provided via corresponding control inputs. The result is digital image data of a second raw image 424 that is to be used for the stereoscopic presentation. This right image 424 is denoted in FIG. 4 as Image II.

The integration time should be exactly the same for both cameras 31, 32 so that moving objects will exhibit similar motion blur. When possible, the camera integration clocks and the shutters should moreover be synchronized. Therefore, global control values are applied to shutters 411, 421 and image sensors 412, 422. Differences between the image exposures can be controlled by means of individual gain settings that are indicated to components 413, 423. Also irises and lenses 411, 421 could be controlled individually for each image by providing a respective individual setting for iris aperture and focus.

The image data of both images 414 and 424 is cropped and combined by processor 33 using the program code 35 for cropping and combining (step 430).

Figure 5:
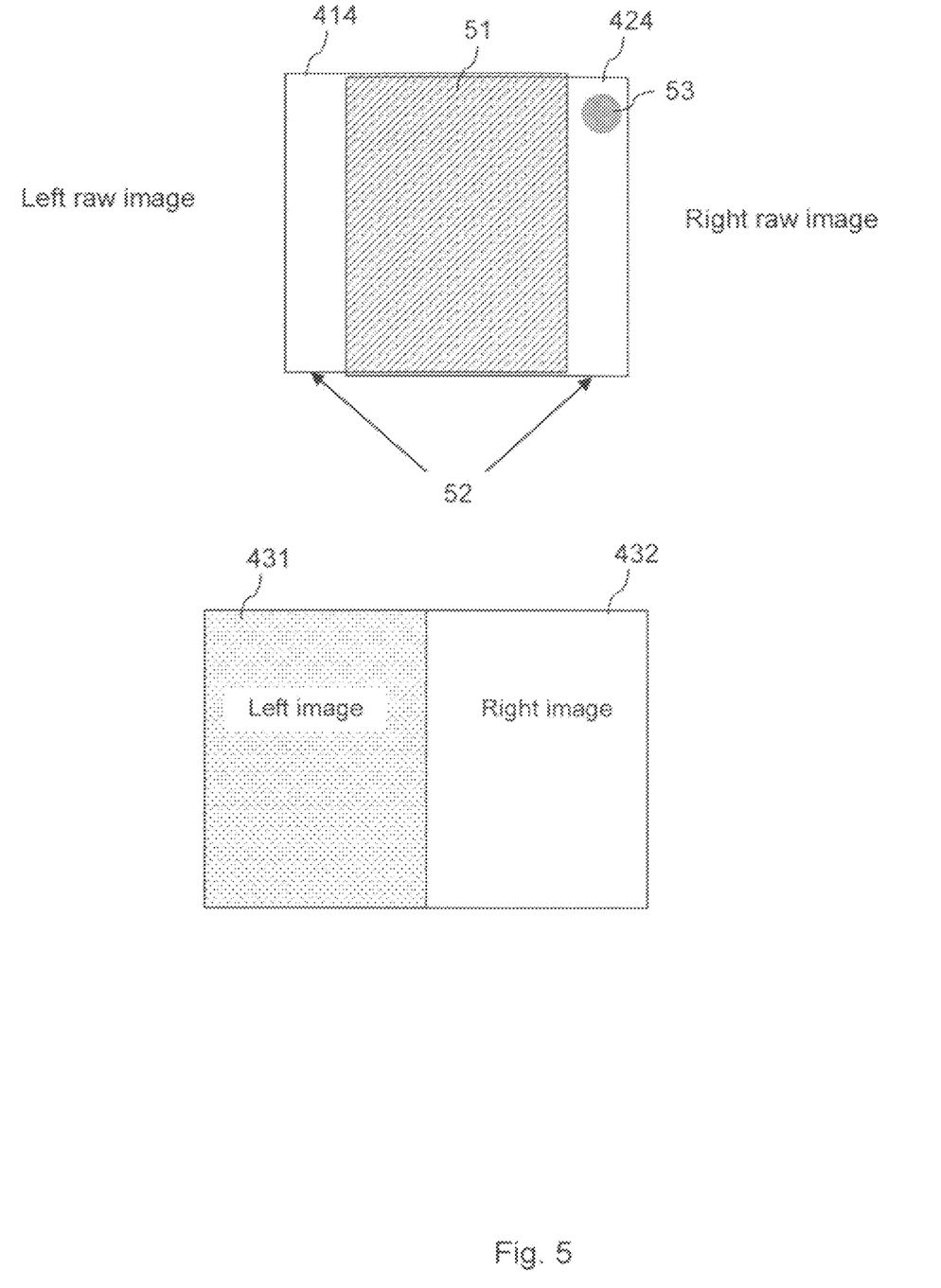
FIG. 5 is a schematic diagram illustrating an image cropping used in the operation presented in FIG. 4.

The cropping and combining is illustrated in more detail in FIG. 5.

As shown in the upper part of FIG. 5, a Euclidian image shift with image edge cropping is applied to the left raw image 414 and the right raw image 424 such that only an overlap region 51 of both images remains for use in the further processing. The cropped areas of the images 52 will not affect the gamma levels. This may also be of advantage, in case a light source 53 is only visible at the edge of one of the images 424.

As shown in the lower part of FIG. 5, the cropped images 431 and 432 are then combined for a common image processing. Combining the images 431, 432 may mean that the data of both images 431, 432 is considered as data of a single larger image.

As indicated by shaded areas next to cropped images 431 and 432 in FIG. 4, the step of cropping does not necessarily imply that the non-overlapping parts are discarded. It is also possible that the entire image data is forwarded together with information about a Euclidean shift and the amount of cropping.

The common image processing (step 433) is applied to the cropped and combined image data by processor 33 using the program code 35 for common processing. The common processing may include various conventional types of image processing, including for example any processing of the image processing pipeline of FIG. 2. It results in commonly processed image data and in addition in global settings for future pairs of images. The purpose of the image processing is to optimize the overall image quality in the combined pair of images. The global settings are selected such that the required changes in future pairs of images are as small as possible. The global image settings can be determined from the joined image pair using standard methods. They may include settings for shutter time and integration time for cameras 31 and 32. They may also include for instance a preliminary global setting for the gain that is to be applied by cameras 31 and 32.

The common processing may include applying algorithms with adjustable control parameters to the data, the parameter values being determined based on the characteristics of the data to which the algorithm is to be applied. There is a risk that effects, which are only apparent in one of the images, might seep through to the data of the other image via the set parameter values if the parameter values are selected based on the entire data. Therefore, a pre-selection of the data that is actually used as a basis for obtaining the control parameters might be carried out.

A quick comparison obtained by subtracting the Red, Green and Blue (RGB) values of one image 431 off the RGB values of the other image 432—with horizontal image shift to compensate for a specific depth plane—can provide information about the object similarity. Comparing the results with a predetermined threshold value provides a mask indicating which parts of a scene are similar to both image sensors 412, 422, and which parts of the scene are occlusion zones only visible to one of the sensors 412, 422.

Figure 6:
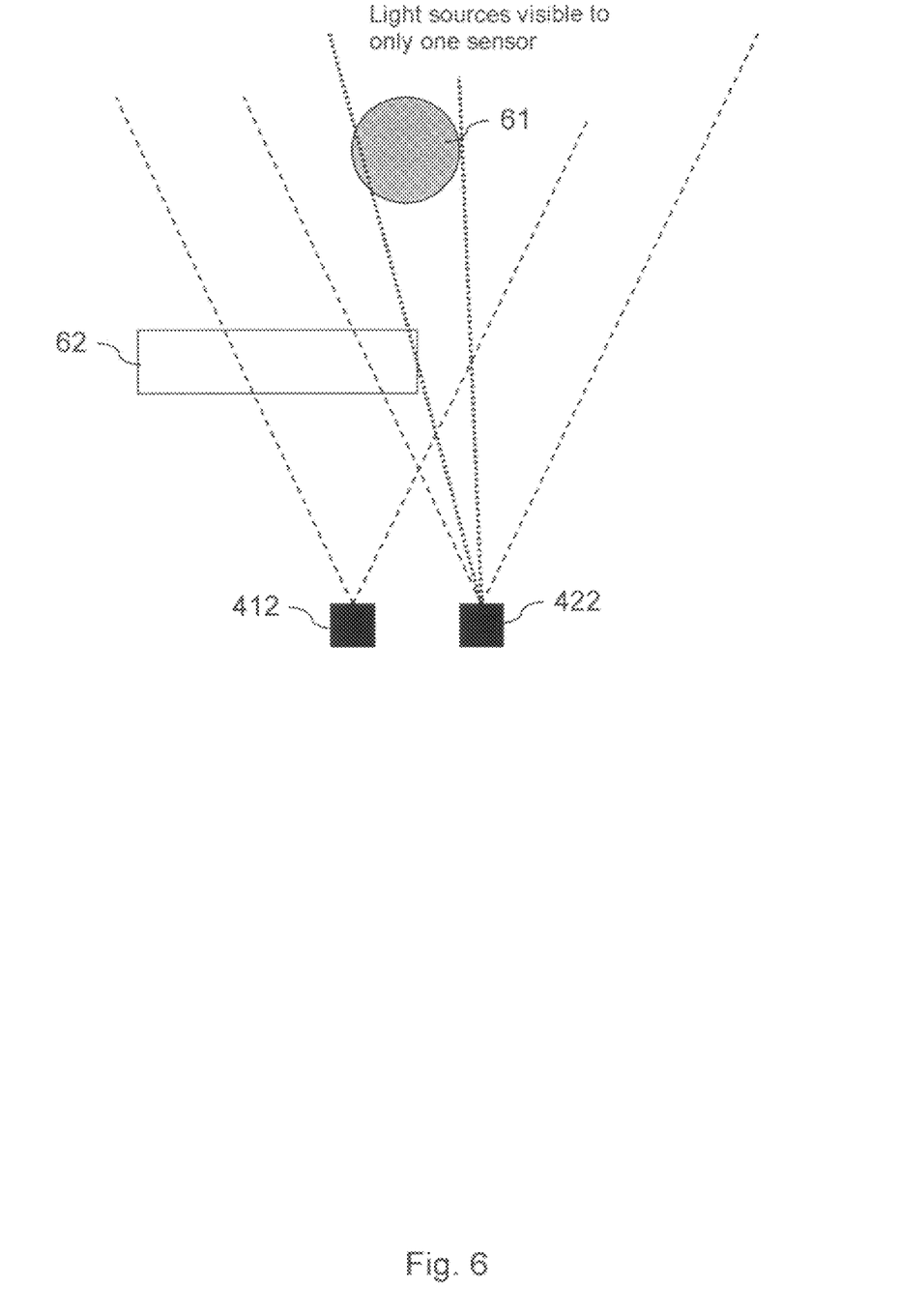
FIG. 6 is a schematic diagram illustrating an exemplary situation in which occlusion zones may have an undesirable affect.

FIG. 6 represents an exemplary scenario in which objects and light sources in a half occlusion spaces can affect one camera sensor differently then the other sensor.

In the presented situation, the image sensor 422 of the right camera 32 takes a picture of a scenario, which includes a light source 61. The image sensor 412 of the left camera 31 is arranged just slightly to the left from image sensor 422 and takes thus a picture of basically the same scenario. For image sensor 412, however, the light source 61 is hidden behind an object 62. This causes differences in the natural gamma detection levels of the sensors 412, 422, hence offsetting the global gamma for one image.

When using the entire image data of both cropped images 431, 432 for determining the control parameters of the common processing, the global gamma will hence be offset for one image and thereby cause problems with in stereoscopic viewing. Therefore, the region of the image taken by the right sensor 422 that includes the light source 61 might be excluded by a mask that is used when determining the control parameters that are employed in the common image processing.

The mask obtained in an RGB comparison can thus be applied when selecting the data that is to form the basis of control parameters for exposure adjustment, gamma balancing and other adjustment algorithms to exclude occlusion zones that might bias the results of one of the images.

In addition to the common processing, the processor 33 applies a fine control to make both images similar using the program code 35 for compensating undesired discrepancies (step 434). In this step, on the one hand at least one processed image of the current image pair is adjusted to be more similar to the other processed image for a stereoscopic presentation. On the other hand, individual camera settings are adjusted relative to the determined global settings resulting in step 433 in such a way as to minimize the observed differences in exposure and focus between follow-up left and right images.

The currently available left and right images are compared to this end by an image comparison. The images used for the comparison can be the original cropped images 431, 432, or processed images output by the image processing block 433. The actual comparison is only applied to relevant parts, that is, to the cropped images that will be used in the stereoscopic presentation, which is further reduced by the determined mask in order to ensure that a negative effect due to occlusion spaces is avoided.

The image comparison can be based on a similar hill climbing optimization as standard auto-focus algorithms to determine gain and focusing differences between the cameras 31, 32, but using as objective function a measure of difference between the brightness and focus of related objects in the images.

Moreover, the same objects should be in sharp focus for both cameras. When the focus depth for one camera is known, this information can be used to easily determine where the object at focus point is visible for the other camera. More specifically, information about approximate object distances can be acquired from the focusing of one camera. A calculation or lookup table can then be used to find the disparity of an object at that distance. The disparity can be used for determining the same object in the image taken by the other camera. A focus algorithm that is used for processing each of the images can then base the sharpness measure on this area alone, giving equivalent focus for the left and right camera.

Figure 7:
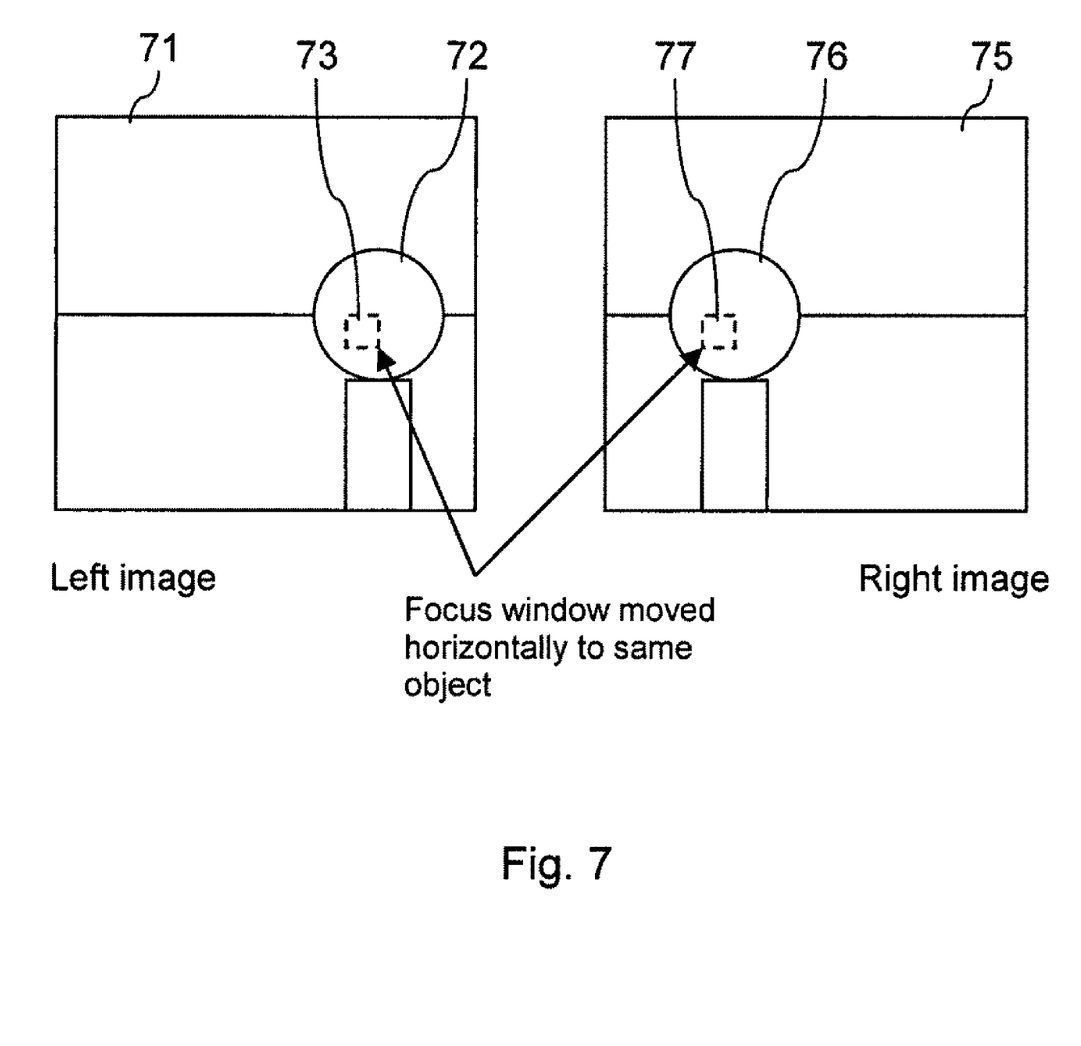
FIG. 7 is a schematic diagram exemplifying how two cameras may be focused at the same object.

FIG. 7 illustrates by way of example how two cameras may be focused at the same object. FIG. 7 comprises on the left hand side a presentation of an image 71 seen by a left camera 31 and on the right hand side a presentation of an image 76 seen by a right camera 32. In a first step, the left camera 31 is focused onto an object 72. The employed focus window 73 is indicated by a dashed rectangle. In a second step, the distance of the left camera 31 to the object 72 is determined based on the focus settings. In a third step, the disparity of the object in the two images 71, 75 is determined based on the knowledge about the distance to the object 72. In a fourth step, the focus window 77 of the second camera is fixed onto the same object 76 by shifting the focus window 77 for the right camera 32 horizontally in accordance to the disparity calculated before. In a fifth step, the focus of the right camera 32 is adjusted to focus on the scene located in the focus window 77, to achieve similar sharpness in both images.

The individual amount of adjustment of brightness and sharpness that is applied to each of the commonly processed images is used in addition to adjust the global gain and focus settings to obtain individual gain and focus settings for the associated cameras 31, 32.

The determined global settings for shutter time and integration time are then applied in common to the control input of both shutters 411, 421 and of both image sensors 412, 422, respectively. The individual settings for focus, iris and gain are applied individually to the control input of irises and lenses 411, 421 and analog processing components 413, 423, respectively. The system thus forms a feedback control system. The effect of changes in control parameters are observed and iteratively refined. This kind of feedback control used to compensate for the differences in images will automatically adapt to any manufacturing discrepancies in the imaging components.

The processor 33 provides in addition the processed left and right images for a stereoscopic presentation. The captured and processed images can be presented immediately to a user on stereoscopic display 37. Alternatively, they may be stored for later use in the data section 36 of memory 34, or they may be transmitted to some other device for presentation via communication component 38.

It is to be understood that it is not required that the comparative processing of step 434 adjusts the image data for presentation. This step could also be used only to generate and apply settings, assuming that after several iterations the resulting left and right images will be similar enough and can be used without further individual processing. In this case, the commonly processed image data resulting in step 433 could be provided for presentation.

Further, it is to be understood that the presented process could also be used for adapting the image data without generating any settings. A processor performing the image processing might not have access to a control input of the cameras, for example if the processor belongs to a mobile phone and the cameras are external to the mobile phone. Further, the mobile phone 30 could receive unprocessed left and right images, for instance via the communication component 38, for a stereoscopic presentation and perform the described processing without generating camera settings before presenting the images on the display 37. A feedback is thus not obligatory.

On the whole, an exemplary system is presented, which uses inter alia a common processing for a plurality of images, which moreover removes selected areas from the image processing process to avoid a cross-talk between images, and which moreover modifies the focus adjustment. Each of these aspects by itself as well as their combination results in a reduction of the complexity of the image processing and/or in a better matching of the images.

The functions illustrated by the processor 33 executing program code 35 can be viewed as means for applying a common image processing to image data for a first image and to image data for a second image; and as means for comparing the image data for the first image and the image data for the second image as a basis for matching the visual appearance of images for a stereoscopic presentation.

The program code 35 can also be viewed as comprising such means in the form of functional modules.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
    applying, by a processor executing code stored in a memory, an image processing in common to image data for a left image and to image data for a right image;
    comparing, by a processor executing code stored in a memory, the image data for the left image and the image data for the right image as a basis for matching a visual appearance of left and right images for a stereoscopic presentation; and
    performing a cropping of the image data for the left image and of the image data for the right image for obtaining data of overlapping parts of the left image and the right image, wherein the image processing is applied only to image data of the overlapping parts.

2. The method according to claim 1, wherein applying the image processing comprises determining global settings for parameters employed by at least two image capturing components providing the image data for the left image and for the right image, respectively.

3. The method according to claim 2, further comprising setting at least one parameter employed by each of the at least two image capturing components according to a determined global setting.

4. The method according to claim 1, wherein comparing the image data comprises comparing only image data of relevant parts of the left image and of the right image, and wherein the relevant parts are determined based on at least one of
    information about an Euclidean shift applied to at least one of the image data for the left image and the image data for the right image;
    information about a cropping applied to at least one of the image data for the left image and the image data for the right image; and
    information about occlusion spaces experienced by at least one of the images compared to the respective other image.

5. The method according to claim 1, further comprising using a result of the comparing of the image data for adjusting at least one of the image data for the left image and the image data for the right image for matching a visual appearance of the left image and the right image for a stereoscopic presentation.

6. The method according to claim 1, further comprising
    using a result of the comparing of the image data for determining for at least one image capturing component providing the image data for one of the left image and the right image an individual setting for an employed parameter, for matching a visual appearance of future images for a stereoscopic presentation; and
    setting the parameter employed by the at least one image capturing component according to the determined individual setting.

7. The method according to claim 1, wherein comparing the image data comprises determining an object in a focus of the left image and determining the same object in the right image, the method further comprising applying a sharpness adjustment for the determined object in the right image and/or applying a focus adjustment to an image capturing component providing the right image based on the determined object.

8. The method according to claim 7, wherein determining the same object in the right image comprises determining a distance of the object based on a focus of an image capturing component providing the left image, determining a disparity associated to the distance and determining the same object in the right image based on the disparity.

9. An apparatus comprising:
    a processor,
    a memory including program code, the memory and program code configured to with the processor, cause the apparatus to establish:
    an image processing component configured to apply an image processing in common to image data for a left image and to image data for a right image;
    an image comparison component configured to compare the image data for the left image and the image data for the right image as a basis for matching a visual appearance of left and right images for a stereoscopic presentation; and
    a cropping component configured to perform a cropping of the image data for the left image and of the image data for the right image for obtaining data of overlapping parts of the left image and the right image, wherein the image processing component is configured to apply the image processing only to image data of the overlapping parts.

10. The apparatus according to claim 9, wherein the image processing component is configured to determine global settings for parameters employed by at least two image capturing components providing the image data for the left image and for the right image, respectively.

11. The apparatus according to claim 10, further comprising a parameter setting component configured to set at least one parameter employed by each of the at least two image capturing components according to a determined global setting.

12. The apparatus according to claim 9, wherein the image comparison component is configured to compare only image data of relevant parts of the left image and of the right image, and wherein the image comparison component is configured to determine the relevant parts based on at least one of
    information about an Euclidean shift applied to at least one of the image data for the left image and the image data for the right image;
    information about a cropping applied to at least one of the image data for the left image and the image data for the right image; and
    information about occlusion spaces experienced by at least one of the images compared to the respective other image.

13. The apparatus according to claim 9, wherein the image comparison component is further configured to use a result of the comparing of the image data for adjusting at least one of the image data for the left image and the image data for the right image for matching a visual appearance of the left image and the right image for a stereoscopic presentation.

14. The apparatus according to claim 9, wherein the image comparison component is configured to use a result of the comparing of the image data for determining for at least one image capturing component providing the image data for one of the left image and the right image an individual setting for an employed parameter, for matching a visual appearance of future images for a stereoscopic presentation and to set the parameter employed by the at least one image capturing component according to the determined individual setting.

15. The apparatus according to claim 9, wherein the image comparison component is configured to determine an object in a focus of the left image, to determine the same object in the right image, and to apply a sharpness adjustment for the determined object in the right image and/or to apply a focus adjustment to an image capturing component providing the right image based on the determined object.

16. The apparatus according to claim 15, wherein the image comparison component is configured to determine the same object in the right image by determining a distance of the object based on a focus of an image capturing component providing the left image, by determining a disparity associated to the distance, and by determining the same object in the right image based on the disparity.

17. The apparatus according to claim 9, wherein the apparatus is a module for an electronic device.

18. The apparatus according to claim 9, wherein the apparatus is an electronic device.

19. The apparatus according to claim 9, wherein the apparatus further comprises the at least two image capturing components.

20. The apparatus according to claim 9, wherein the apparatus further comprises a stereoscopic display.

21. The apparatus according to claim 9, wherein the apparatus further comprises a wireless communication component enabling at least one of
   a reception of captured image data; and
   a transmission of processed image data.

22. A system comprising:
   an apparatus according to claim 9; and
   at least two image capturing components configured to capture image data and to provide the captured image data to the apparatus.

23. A non-transitory computer readable medium storing program code, the program code realizing the following when executed by a processor:
   applying, by a processor executing code stored in a memory, an image processing in common to image data for a left image and to image data for a right image;
   comparing, by a processor executing code stored in a memory, the image data for the left image and the image data for the right image as a basis for matching a visual appearance of left and right images for a stereoscopic presentation; and
   performing a cropping of the image data for the left image and of the image data for the right image for obtaining data of overlapping parts of the left image and the right image, wherein the image processing is applied only to image data of the overlapping parts.

24. An apparatus comprising:
   means for applying an image processing in common to image data for a left image and to image data for a right image;
   means for comparing the image data for the left image and the image data for the right image as a basis for matching a visual appearance of left and right images for a stereoscopic presentation; and
   means for performing a cropping of the image data for the left image and of the image data for the right image for obtaining data of overlapping parts of the left image and the right image, wherein the image processing is applied only to image data of the overlapping parts.

* * * * *